United States Patent [19]

Ewing

[11] 4,270,256
[45] Jun. 2, 1981

[54] MANUFACTURE OF COMPOSITE TURBINE ROTORS

[75] Inventor: Bruce A. Ewing, Martinsville, Ind.

[73] Assignee: General Motors Corporation, Detroit, Mich.

[21] Appl. No.: 46,104

[22] Filed: Jun. 6, 1979

[51] Int. Cl.³ .............................................. B23P 15/04
[52] U.S. Cl. ................................. 29/156.8 R; 29/423; 29/447; 228/193; 228/191
[58] Field of Search .................... 29/156.8 R, 156.8 B, 29/423, 447; 228/193, 191, 213

[56] References Cited

U.S. PATENT DOCUMENTS

| | | | |
|---|---|---|---|
| 2,450,493 | 10/1948 | Strub | 416/213 |
| 2,475,772 | 7/1949 | Allen et al. | 29/156.8 R |
| 3,246,389 | 4/1966 | Pfau | 416/213 |
| 3,571,906 | 3/1971 | Barth | 29/423 |
| 4,051,585 | 10/1977 | Walker et al. | 29/156.8 R |
| 4,096,615 | 6/1978 | Cross | 29/156.8 R |
| 4,186,473 | 2/1980 | Cross et al. | 29/156.8 R |

Primary Examiner—Daniel C. Crane
Attorney, Agent, or Firm—J. C. Evans

[57] ABSTRACT

A method for manufacturing a turbine rotor assembly from dissimilar materials to produce a hybrid composite rotor including the steps of: preforming a hub disc of a controlled outer diameter and prefabricating a ring of airfoils including a machine slotted fixture ring of mild steel slotted to receive airfoils inserted therein; and wherein the method further includes the steps of grinding the internal diameter of the mild steel ring to expose the airfoil bases to locate them at a radius line which will correspond to the outer diameter of the hub disc rim to maintain a pressure fit relationship therebetween when the ring of airfoils is pressed or shrunk on the outer diameter of the disc and thereafter sealing exterior joint lines between the mild steel fixture ring, airfoils and hub disc to form a pressure sealed surface on the exterior of the joined parts; subjecting the full outer planar extent of the pressure sealed configuration to an elevated pressure while maintaining it under an elevated temperature to produce a hot isostatic bonding of the base of each of the airfoils against the controlled outside diameter of the hub disc for a time period to produce a diffusion bonded metallurgical joint between the parts; and thereafter removing the mild steel fixture ring from the joined parts by dissolving it in a pickling solution thereby to define precision flow passages between facing surfaces of the airfoils and the hub surface of the disc.

2 Claims, 7 Drawing Figures

U.S. Patent  Jun. 2, 1981  4,270,256
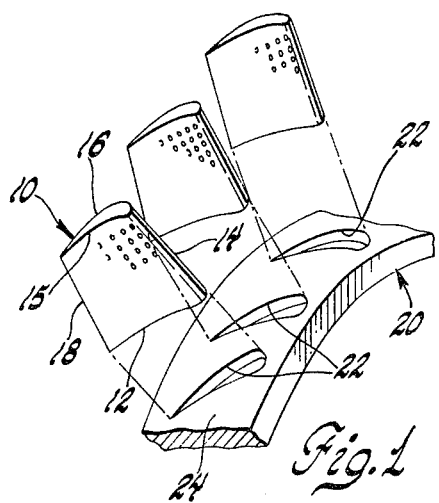
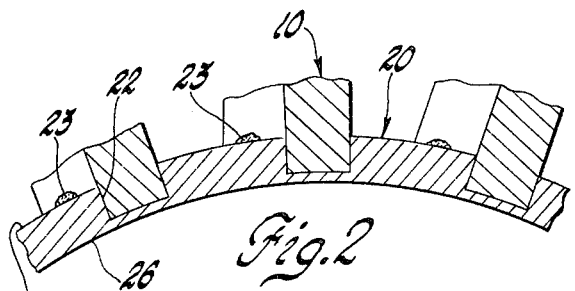
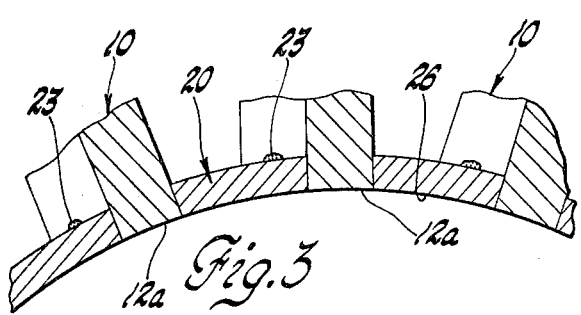
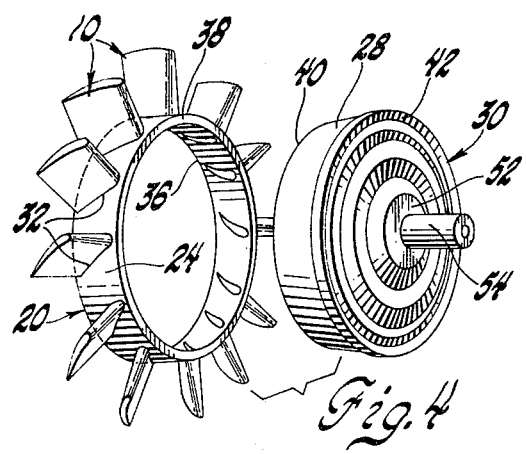
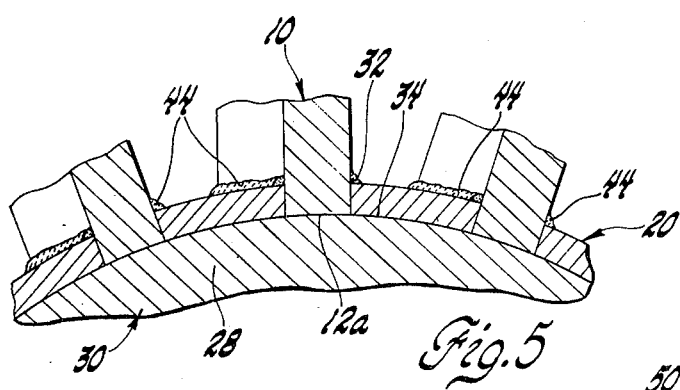
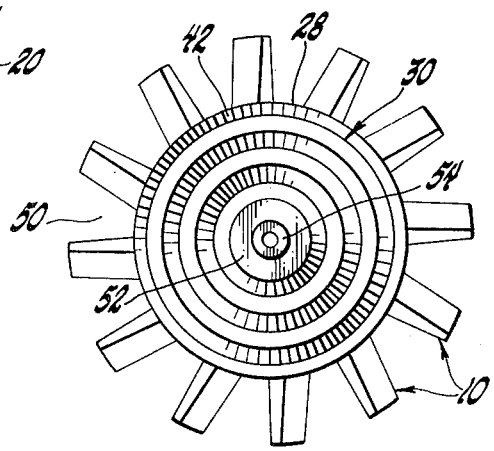

MANUFACTURE OF COMPOSITE TURBINE ROTORS

This invention relates to hybrid turbine rotor assemblies with parts of dissimilar metallurgy and more particularly to a method for assembling such hybrid turbine rotors by use of hot isostatic pressure to produce a diffusion bond between mating surfaces of the dissimilar parts.

Various proposals have been suggested for joining an airfoil ring to a wheel disc of a turbine rotor wherein the airfoil components will withstand high temperature operating conditions and the disc will have high strength capabilities so as to withstand stresses produced at the rim of the wheel during cycles of gas turbine engine operation wherein the rim is subjected to high temperatures while the center of the disc is subjected concurrently to lower operating temperatures. An example of one such hybrid turbine rotor is set forth in U.S. Pat. No. 4,096,615, issued June 27, 1978, to Cross for TURBINE ROTOR FABRICATION.

In this arrangement a dual property rotor has a disc and ring of blades interconnected by use of a fixture which becomes part of the rotor to form the hybrid completed product.

The present invention is directed to an improved method for hybrid rotor fabrication where a low cost expendable fixture is used to precisely locate airfoil components in a configuration to maintain a desired accurately placed aerodynamic flow path through an airfoil array on a near net shaped metal turbine disc having a machined rim with a precisely dimensioned outer diameter without the need for external fixtures to fasten the airfoils to the disc.

Thus, an object of the present invention is to improve methods of manufacturing hybrid turbine wheels by the use of an expendable fixture ring having blade carrying slots therein that receive base portions of individual airfoil elements and the slots being preformed to align each of the airfoils in a precise dimensional relationship therebetween for defining air flow passages therethrough and wherein the precisely located airfoils and expendable fixture ring are processed to expose the airfoil bases while configuring them to be shrunk fit into close press fit relationship with the outside diameter of a near net shaped outside diameter on a turbine wheel disc; and thereafter sealing joint lines on the outer surface of the expendable fixture ring and adjacent surfaces on the airfoil to define a pressurizable exterior surface on the outside of the joined parts for application of a hot isostatic environment thereon to press mating surfaces of the disc and the airfoils into diffusion bonding relationship to form highly efficient metallurgical joint between the airfoils and the disc and thereafter removing the expendable ring by dissolving the material of the expendable ring fixture without attacking the other parts.

Another object of the present invention is to improve the manufacture of hybrid turbine wheel assemblies having a disc of a first metallurgical composition and an airfoil array of a second metallurgical composition including precisely configured airfoil passages between adjacent airfoils of the airfoil array by a method that includes preforming a slotted expendable mild steel fixture ring; inserting preformed airfoils of a first metallurgical composition into the machine slots of the mild steel ring to form an exact precision location of the inserted airfoils to form precisely dimensioned air flow passages therebetween; thereafter grinding an inside diameter of the mild steel ring to expose base portions of the airfoils while shaping them to a configuration corresponding to a near net shaped outside diameter on a disc of a second metallurgical composition; shrink fitting the expendable fixture ring and the exposed airfoil bases onto the outside diameter of the disc; sealing all exposed joints on the joined parts for defining an exteriorly located, sealed pressure surface for application of a hot isostatic environment; thereafter subjecting the joined sealed parts to a hot isostatic process cycle to produce a diffusion bonded metallurgical joint between each of the airfoil bases and their supporting disc; and removing the expendable mild steel fixture ring from the diffusion bonded parts by dissolving the mild steel expendable ring from the fabricated structure following the hot isostatic press operation of the method without attacking the other parts thereby to define precise airfoil air flow patterns through the joined airfoil array and disc.

Further objects and advantages of the present invention will be apparent from the following description, reference being had to the accompanying drawings wherein a preferred embodiment of the present invention is clearly shown.

FIG. 1 is a diagrammatically illustrated, fragmentary exploded view of an expendable fixture ring and airfoils utilized in the method of the present invention;

FIG. 2 is a fragmentary, sectional view showing the disposition of airfoil components with respect to the expendable fixture ring during an initial assembly step of the improved method;

FIG. 3 is a fragmentary sectional view like FIG. 2 wherein the expendable fixture ring has been reworked to produce precise exposure and alignment of base portions of the airfoils in juxtaposed relationship with the rim of a near net shaped hub disc of a turbine wheel having a precisely dimensioned outer diameter.

FIG. 4 is a perspective view of an airfoil array on the expendable fixture ring in a position prior to a press fit step to locate the inside diameter of the expendable fixture ring and the exposed base portions of the airfoils on the precisely formed outer rim of the hub disc;

FIG. 5 is a fragmentary, sectional view showing a press fit disposition of parts from the step in FIG. 4 including braze sealed formations at exterior joints of the joined parts preparatory to a hot isostatic process sequence in the present invention;

FIG. 6 is a fragmentary sectional view showing the relationship of airfoils and hub disc following removal of the expendable fixture ring by dissolving it in a solution that selectively removes the fixture ring without attacking the airfoils and hub disc; and FIG. 7 is an end elevational view of an assembled hub and airfoil assembly manufactured by the method of the present invention.

Referring now to the drawings, in FIG. 1, a plurality of preformed, cast air coiled airfoils 10 are illustrated, each having a base 12 thereon and including a leading edge 14 joined by suction and pressure surfaces 15, 16 respectively thereof to a trailing edge 18 of the airfoils 10. Such air cooled airfoils are of the type set forth in U.S. Pat. No. 3,732,031, issued May 8, 1973, to Charles E. Bowling et al., for COOLED AIRFOIL.

The airfoils of FIG. 1 are shown in an exploded relationship to a mild steel, expendable fixture ring 20 which includes slots 22 formed at circumferentially spaced points therearound and configured to receive the base 12 of each of the airfoils 10.

An initial step includes positioning the airfoils 10 in the slots 22 of the ring 20 as shown in FIG. 2 and temporarily fastening them at fixed locations with respect thereto by suitable means such as tack welds 23 between the exposed surfaces of the airfoils 10 and the outer peripheral surface 24 of the mild steel fixture ring 20.

In the illustrated method the ring 20 is preformed with slots 22 that pass only through a part of the depth of the expendable fixture ring 20 to assure dimensionally precise location of the airfoil surfaces represented by the suction and pressure surfaces 15 and 16 thereon.

Following precise location of the airfoils 10 the inside diameter 26 of the expendable mild steel fixture ring 20 is machined to expose the bases 12 and to form a curvature 12a thereon corresponding to that of a precisely formed outer rim 28 on a near net shaped rotor hub disc 30 that preferably has a metallurgical composition that is suitable for turbine hub use; usually dissimilar to the metallurgy of each of the airfoils 10. Thus, the hub disc 30 is preferably of a consolidated powder metal having high stress resistance characteristics. The outside rim 28/or O.D. is premachined to an accurate diameter which is slightly less than that of the inside diameter 26 of the expendable metal fixture ring 20 when it has been machined to form the airfoil bases 12a as shown in FIG. 3.

The preformed fixture ring 20 with the airfoils 10 thereon is then press fit on the outside diameter defined by the rim 28 of the disc 30. In one arrangement, the press fit is obtained by maintaining the preformed disc 30 at ambient conditions and heating the fixture ring 20 and the airfoils 10 thereon to an elevated temperature in the range of 400° F. to cause the fixture ring to expand sufficiently to be slipped onto the rim 28. Thereafter, the expendable ring and airfoils 10 thereon are reduced in temperature so as to cause them to shrink into place on the rim 28 of the hub disc 30 whereby the bases 12a of each of the airfoils 10 are located in intimate, juxtaposed relationship with the surface metal of the hub rim 28 as is seen in FIG. 5.

The next step in the present invention is to seal all of the exteriorly exposed joints of the assembly including an exterior joint line 32 around the juncture of each of the airfoils 10 and the outer peripheral surface 24 of the expendable ring 20 as shown in FIG. 4; and front and rear joint lines at the ends of an extension of the interface line 34 shown at FIG. 5 where it extends to the front and rear edges 36, 38 of the expendable mild steel fixture ring 20 and the fore and aft surfaces 40, 42 of the hub 30. The braze sequence to produce the braze seal of the airfoil/ring joint lines 32 and joint lines at the edges 36, 38 of the expendable metal fixture ring 20 and the fore and aft surfaces 40, 42 of hub disc 30 is produced in accordance with a vacuum braze schedule wherein the parts are first vacuum outgassed at an elevated temperature in excess of 2000° F. for an extended period in the order of one hour. Thereafter, the exterior joint lines defined above are covered by a layer of silicon boron modified braze material which is representative of one suitable braze material to produce an outer seal of these joint lines without contaminating the juncture between the bases 12a and the outer diameter 28 as shown in FIG. 5.

In one representative arrangement, materials utilized in the parts to be joined are set forth below:

|  | Si | C | Cr | Co | Mo | W | Fe |
|---|---|---|---|---|---|---|---|
| Airfoil 10 | 0 | .15 | 9.0 | 10.0 | 2.5 | 10.0 | — |
| Hub Disc 30 | 0 | .15 | 12.7 | 9.4 | 1.9 | 4.0 | — |
| Ring 20-SAE 1010 |  |  |  |  |  |  |  |
| Braze Powder | 2.5 | .17 | 10.0 | 9.7 | .6 | 10.8 | — |

|  | Ta | Ti | Al | B | Zr | Hf | Ni |
|---|---|---|---|---|---|---|---|
| Airfoil 10 | 1.5 | 1.5 | 5.5 | .02 | .05 | 1.0 | Bal. |
| Hub Disc 28 | 3.8 | 4.1 | 3.7 | .01 | .10 | .9 | Bal. |
| Braze Powder | 3.1 | 1.6 | 5.5 | 1.1 | .05 | 1.4 | Bal. |

Once the parts have been sealed together by the application of a suitable braze material at the aforesaid exterior joint lines the braze sealed parts are maintained under vacuum and held at a temperature of 2050° F. for 30 minutes; thereafter, the parts are cooled to 2000° F. and held at that temperature for a limited time in the order of 10 minutes for solidification of sealant layers 44 along each of the joints, partially shown in FIG. 5.

The braze temperatures and braze alloy compositions are selected to be compatible with solution heat treatment requirements for the high alloy material from which the airfoils 10 are formed.

After sealing the joint lines the braze sealed assembly is visually inspected for integrity and thereafter rechecked by placing it in a chamber of high pressure helium gas. After an appropriate exposure to the high pressure helium gas the sealed joints are checked with a spectrometer for possible helium bleed-back through pin holes or microscopic flaws in the braze sealant layers 44 that cover the joint lines 32 and the joint lines at the extensions of the interface 34 where they are exposed. This test shows that the interface 34 as shown in FIG. 5 is effectively both vacuum purged and sealed against the re-entrance of contaminants. The joined parts are located in an autoclave and hot isostatically pressed by a process set forth below.

A high hot isostatic press temperature, in conjuction with the application of pressure in the range of 15,000 p.s.i. insures intimate contact between the exposed bases 12a, and the outside of rim 28 so that the parts are connected by diffusion bonding therebetween to produce a high quality metallurgical joint therebetween.

By way of summary, typical sequences used in the present invention are as follows:

HOT ISOSTATIC PRESS BONDING at 15 Ksi

2225° F. (3 Hrs.)—HIP Cycle

FINAL HEAT TREATMENT

2050° F. (2 Hrs.)—Simulated coating diffusion cycle + 1600° F. (24 Hr.)— Age cycle.

Once the parts have been formed by hot isostatic pressure bonding to form a metallurgically formed joint as shown at the reference numerals 46 in FIG. 6, the joined parts which have been bonded together and are in the form shown in FIG. 5 are dipped in a suitable pickling solution such as nitric acid/water solution maintained at a temperature of 200° F. which will dissolve the mild steel expendable fixture ring 20 from the assembled structure without attacking the high alloy material of the airfoils 10 and the material of the hub disc 30. The selective removal of the expendable fixture ring 20 will produce a resultant structure of the form shown in FIGS. 6 and 7 which will define a resultant accurately formed airfoil passage 50 defined in part by the outer diameter 28 of the hub 30 and the outer surface configuration of each of the airfoils 10.

Thus, the invention results in a finished, high quality, hybrid turbine wheel assembly having metallurgically bonded interface joints therein of high strength characteristics between materials of dissimilar metallurgy wherein the airfoils 10 are capable of withstanding high temperature exposure and wherein the wheel disc 30 is capable of withstanding substantial stresses that are induced therein during heating of the rim portion thereof to elevated temperatures while the shaft connected portion 52 thereof which is joined to a drive shaft 54 operates at a lower temperature condition.

By use of the present invention, the expendable fixture ring is easily removed from the parts after locating individual airfoils at precise dimensional relationships therebetween and with respect to the separately formed disc hub 30 thereby eliminating inclusion of fixture rings within the final assembly.

While the embodiments of the present invention, as herein disclosed, constitute a preferred form, it is to be understood that other forms might be adopted.

The embodiments of the invention in which an exclusive property or privilege is claimed are defined as follows:

1. A method for manufacturing a composite turbine wheel having a disc hub of a first material and including a plurality of airfoils on the outside diameter comprising the steps of preforming a hub ring of expendable material to have a plurality of circumferentially spaced slots therein; forming a plurality of airfoil elements each having a base thereon, inserting said airfoil bases into said slots for locating said airfoils around the outer perimeter of said expendable ring and to expose the bases at the inner surface of said ring, preforming a disc hub having a controlled O.D. thereon, fitting the expendable ring on said controlled O.D. to mate the bases with said controlled O.D., sealing exterior joints between each of said airfoil elements and said expendable ring, sealing exterior joints between said ring and said disc hub, thereafter applying a hot isostatic environment to the full exposed exterior surfaces of said airfoils, expendable ring and hub disc to produce a resultant force acting inwardly on each of said airfoil elements which maintain the hub disc at an elevated temperature to produce metallurgical diffusion at the interface of the mating bases and controlled O.D. to produce a diffusion bond between the airfoils and the disc hub, thereafter dissolving all of the ring of expendable material from the joined airfoil elements and the disc hub to form controlled flow passages between each of said airfoils.

2. A method for manufacturing a composite turbine wheel having a disc hub of a first material and including a plurality of airfoils on the outside diameter comprising the steps of preforming a hub ring of expendable material to have a plurality of circumferentially spaced slots therein; forming a plurality of airfoil elements each having a base thereon, inserting said airfoil bases into said slots for locating said airfoils around the outer perimeter of said expendable ring, removing the inside diameter of said expendable ring to expose said airfoil bases, preforming a disc hub having a controlled O.D. thereon, shrink fitting the expendable ring on said controlled O.D. to mate the bases with said controlled O.D., sealing the exterior joints between each of said airfoils, said expendable ring and said hub disc, thereafter pressurizing the full exposed exterior surfaces of said airfoils and said expendable ring to produce a resultant force acting inwardly on each of said airfoil elements and maintaining the disc hub ring and airfoils at an elevated temperature to produce metallurgical diffusion at the interface of the bases and controlled O.D. to produce a diffusion bond between the airfoils and the disc hub, thereafter dissolving all of the ring of expendable material from the joined airfoils and disc hub to form controlled flow passages between each of said airfoils.

* * * * *